(12) United States Patent
Widiaman et al.

(10) Patent No.: US 9,928,394 B2
(45) Date of Patent: Mar. 27, 2018

(54) PROTECTIVE CASE WITH BARCODE SCANNER

(71) Applicant: HEWLETT-PACKARD DEVELOPMENT COMPANY, L.P., Houston, TX (US)

(72) Inventors: Rudy Widiaman, Houston, TX (US); Eric Chen, Houston, TX (US); Vincent Kenya Shyu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/329,869

(22) PCT Filed: Sep. 3, 2014

(86) PCT No.: PCT/US2014/053877
§ 371 (c)(1),
(2) Date: Jan. 27, 2017

(87) PCT Pub. No.: WO2016/036361
PCT Pub. Date: Mar. 10, 2016

(65) Prior Publication Data
US 2017/0277924 A1    Sep. 28, 2017

(51) Int. Cl.
*G06K 7/10*    (2006.01)
*G06K 7/14*    (2006.01)
*A45C 11/00*    (2006.01)
*A45C 15/00*    (2006.01)

(52) U.S. Cl.
CPC ............ *G06K 7/1413* (2013.01); *A45C 11/00* (2013.01); *A45C 15/00* (2013.01); *A45C 2011/002* (2013.01); *A45C 2011/003* (2013.01); *A45C 2200/10* (2013.01); *G06K 2007/10524* (2013.01)

(58) Field of Classification Search
CPC ............ G06K 7/10; G06K 9/22; G06F 17/00
USPC .................. 235/462.45, 375, 472.01, 462.43
See application file for complete search history.

(56) References Cited

U.S. PATENT DOCUMENTS

| 8,152,071 B2 | 4/2012 | Doherty et al. |
| 2004/0111320 A1 | 6/2004 | Schlieffers et al. |

(Continued)

FOREIGN PATENT DOCUMENTS

| CN | 202407554 U | 9/2012 |
| TW | 200921412 A | 5/2000 |
| TW | 200947186 A | 11/2009 |

OTHER PUBLICATIONS

"Barcode Scanner Tablet—PC LQBS7," LinQTab, 2014, pp. 1-4.
Enterprise Barcode Sled GS-SL2000 for Samsung Trend Duos Android Smart Phone, 2009, pp. 1-5, GeneralScan.

*Primary Examiner* — Edwyn Labaze
(74) *Attorney, Agent, or Firm* — HP Inc Patent Department

(57) ABSTRACT

Example implementations relate to a protective case with a barcode scanner. For example, the protective case may include a housing with a cavity to house a computing device. The housing may include a display portion to allow a screen of the computing device to be exposed, a back portion opposite the display portion, and a scanning sidewall perpendicular to and between the display portion and the back portion. The protective case may also include a barcode scanner to scan a barcode from the scanning sidewall.

12 Claims, 4 Drawing Sheets

(56) References Cited

U.S. PATENT DOCUMENTS

| | | | |
|---|---|---|---|
| 2007/0223182 A1* | 9/2007 | Swan | G06F 1/1632 361/730 |
| 2010/0088439 A1* | 4/2010 | Ang | G06F 1/1632 710/105 |
| 2011/0228458 A1* | 9/2011 | Richardson | H04M 1/0252 361/679.01 |
| 2013/0109316 A1 | 5/2013 | Lee | |
| 2013/0146661 A1 | 6/2013 | Melbrod et al. | |
| 2013/0265703 A1 | 10/2013 | Diebel | |
| 2014/0009387 A1 | 1/2014 | Hwang | |
| 2014/0191034 A1* | 7/2014 | Glanzer | G06K 7/082 235/449 |

\* cited by examiner

PROTECTIVE CASE WITH BARCODE SCANNER

BACKGROUND

The emergence and popularity of mobile computing has made portable computing devices a staple in today's marketplace, due to their compact design and light weight. Tablet computers are examples of portable computing devices that are widely used. Tablet computers generally employ a touchscreen on a display surface of the tablet that may be used for both viewing and input. Users of tablets may interact with the touchscreen via finger or stylus gestures. As an example, an on-screen keyboard may be illustrated on the touchscreen surface for entering characters.

BRIEF DESCRIPTION OF THE DRAWINGS

Some examples of the present application are described with respect to the following figures.

DETAILED DESCRIPTION

Figure 1:
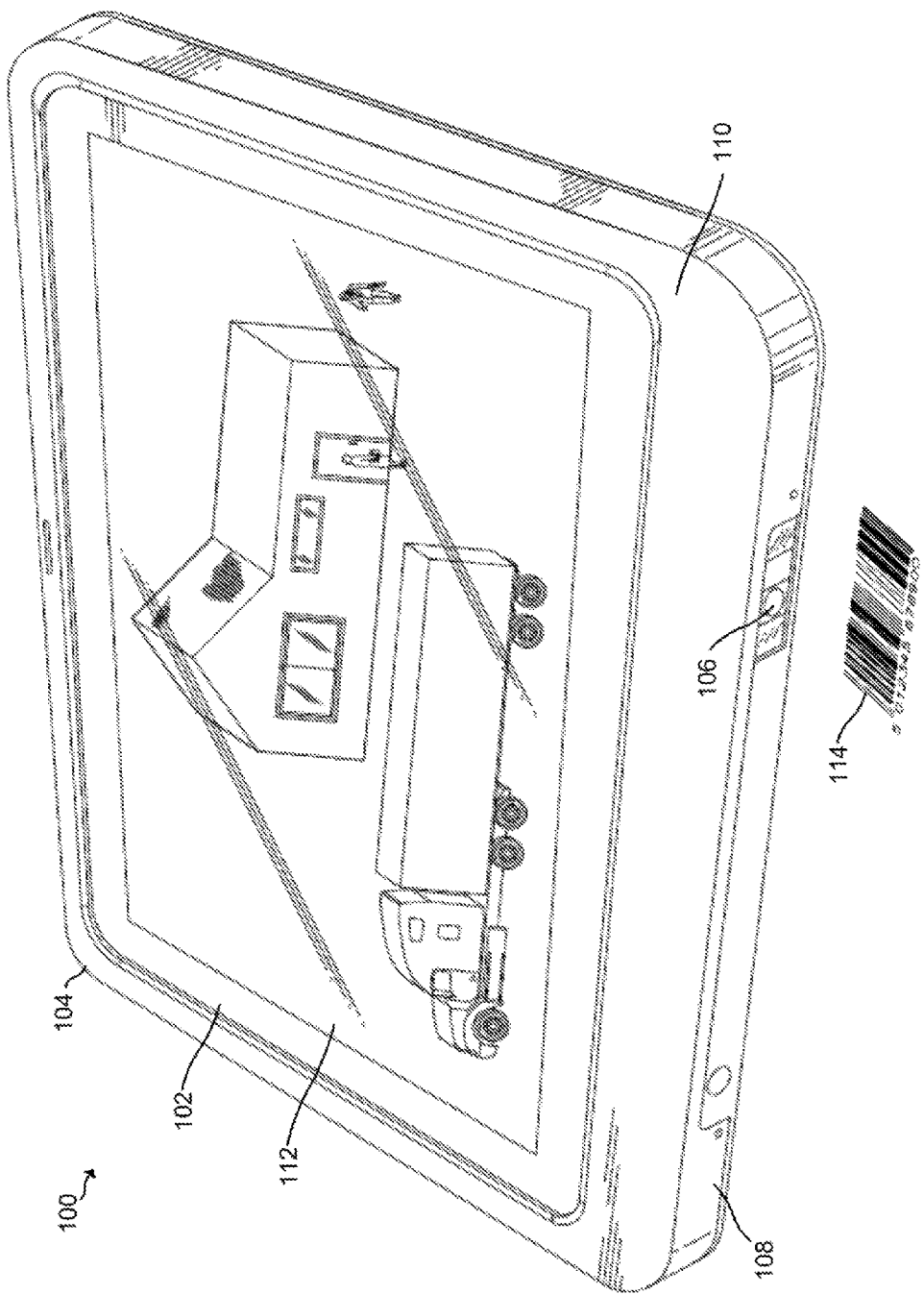
FIG. 1 is a schematic diagram of an example system with a computing device in a protective case having a barcode scanner pointed downward.

As described above, the use of mobile computing has become popular. While using a portable computing device (e.g., a tablet computer, a mobile phone, etc.), it may be desirable to protect the computing device. A protective case to protect a computing device is disclosed herein, where the protective case is capable of protecting the computing device from different environments. For example, a protective case for a tablet computer may prevent damage to the tablet computer from accidental drops and any other external environmental conditions, such as liquid, dirt, dust, debris, and the like. The protective case may be used to cover various portions of the portable computing device and may be communicatively coupled to the computing device via any suitable connector.

The protective case may include a barcode scanner capable of scanning barcodes. The barcode scanner may be any suitable electronic device to read barcodes. The barcode scanner may include any suitable light source, any suitable lens, and any suitable light sensor translating optical impulses into electrical impulses. In some examples, the barcode scanner may include decoder circuitry to analyze the barcode's image data provided by the sensor and to send the barcode's content to the computing device in the protective case. The computing device in the protective case may be used to obtain information from a barcode scanned by the barcode scanner on the protective case. For example, the computing device in the protective case may be used in a medical environment to read barcodes on patient forms and/or tags, prescription bottles, and the like.

The protective case may include a housing with a cavity to house the computing device. The housing may include a display portion that allows a screen of the computing device to be exposed in any suitable manner. For example, the display portion may include a transparent material such that the screen is exposed or may have a cut-out window such that the screen is exposed (e.g., no material covering the screen). The protective case may also include a back portion opposite the display portion to cover the back of the computing device. The protective case may also include four sidewalls perpendicular to and between the display portion and the back portion to cover the edges of the computing device, where two of the sidewalls are each along a short edge of the computing device and two of the sidewalls are each along a long edge of the computing device. The barcode scanner may be positioned on one of the sidewalls such that a barcode may be scanned by pointing that sidewall at a barcode. For example, the barcode scanner may be positioned on one of the long sidewalls such that a user may hold the computing device with the protective case on each of the short sidewalls while pointing the barcode scanner at a barcode. In another example, the barcode scanner may be positioned on one of the short sidewalls such that a user may hold the computing device with the protective case on each of the long sidewalls while pointing the barcode scanner at a barcode. Because the barcode scanner is located on a sidewall of the protective case (e.g., instead of on the display portion or the back portion of the protective case), the thickness of the protective case may be relatively small in length.

As used herein, "computing device" may refer to any suitable type of computing device that may be used with the protective case, such as a tablet computer, a smartphone, a cellular telephone, a personal digital assistant (PDA), a laptop, a notebook, a "phablet" device (e.g., a phone/tablet device), a computer, a portable reading device, and the like.

Referring now to the figures, FIG. 1 is a schematic diagram of an example system 100 with a computing device 102 in a protective case 104 having a barcode scanner 106 pointed downward. In the example of FIG. 1 computing device 102 is a tablet computer having screen 112 to display content.

Protective case 104 may include a display portion 110 that may cover the front of computing device 102 and may expose screen 112. Display portion 110 may expose screen 112 in any suitable manner (e.g., using a transparent material, a cut-out portion on front portion 110, etc.). Protective case 104 may also include a back portion to cover the back of computing device 102.

Protective case 104 may also include a sidewall 108 that may be perpendicular to and between display portion 110 and the back portion. Sidewall 108 may be a long sidewall that protects the long edge of computing device 102. Sidewall 108 may be a scanning sidewall that may scan barcodes (e.g., barcode 114) using barcode scanner 106, which may be any suitable type of barcode scanner. For example, a user may hold on to one or both of the short edges of computing device 102 in protective case 104 and may point barcode scanner 106 downward at barcode 114 to scan barcode 114. Computing device 102 may receive the barcode information from barcode scanner 106 via a connector on protective case 104 connecting computing device 102 to protective case 104.

The content displayed on screen 112 may be displayed such that the content is oriented based on the orientation of computing device 102 in protective case 104. For example, because barcode scanner 106 is pointed downward, the content on screen 112 is displayed based on the computing device 102 in protective case 104 being oriented accordingly.

Figure 2:
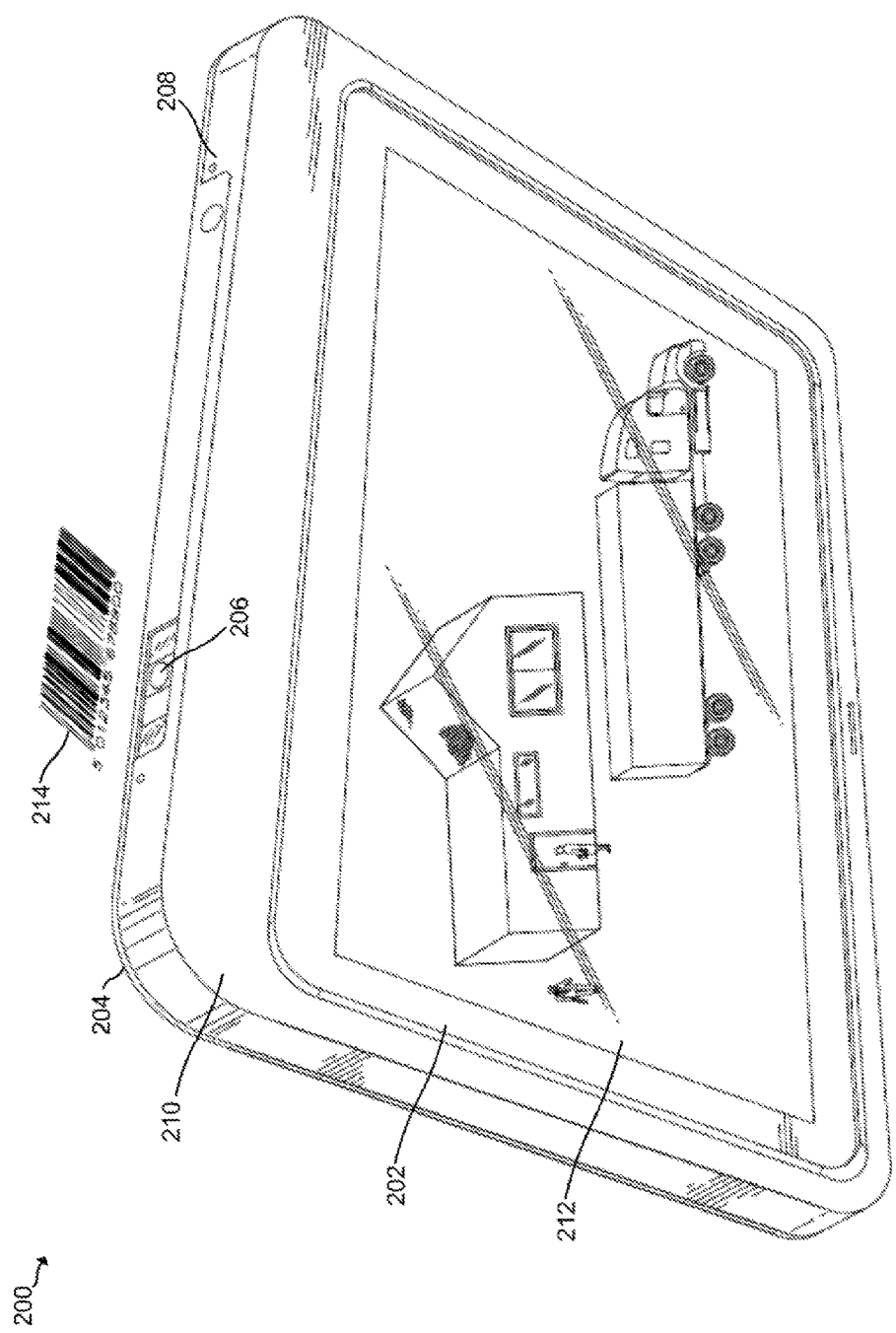
FIG. 2 is a schematic diagram of an example system with a computing device in a protective case having a barcode scanner pointed upward.

FIG. 2 is a schematic diagram of an example system 200 with a computing device in a protective case having a barcode scanner pointed upward. In the example of FIG. 2, computing device 202 is a tablet computer having screen 112 to display content.

Similar to FIG. 1, protective case 202 of FIG. 2 may include a display portion 210 that may cover the front of computing device 202 and may expose screen 212. Display portion 210 may expose screen 212 in any suitable manner (e.g., using a transparent material, a cut-out portion on front portion 210, etc.). Protective case 204 may also include a back portion to cover the back of computing device 202.

Protective case 204 may also include a sidewall 208 that may be, perpendicular to and between display portion 210 and the back portion. Sidewall 208 may be a long sidewall that protects the long edge of computing device 202. Sidewall 208 may be a scanning sidewall that may scan barcodes (e.g., barcode 214) using barcode scanner 206, which may be any suitable type of barcode scanner. For example, a user may hold on to one or both of the short edges of computing device 202 in protective case 204 and may point barcode scanner 206 downward at barcode 214 to scan barcode 214. Computing device 202 may receive the barcode information from barcode scanner 206 via a connector on protective case 204 connecting computing device 202 to protective case 204.

The content displayed on screen 212 may be displayed such that the content is oriented based on the orientation of computing device 202 in protective case 204. For example, because barcode scanner 206 is pointed upward, the content on screen 212 is displayed based on the computing device 202 in protective case 204 being oriented accordingly. For example, if computing device 202 in protective case 204 were rotated to the orientation shown in FIG. 2 from the orientation of computing device 102 in protective case 104 shown in FIG. 1, the content on screen 212 would rotate accordingly such that the user may be able to view the appropriate orientation of the content regardless of the direction in which the barcode scanner 206 was pointing.

Figure 3:
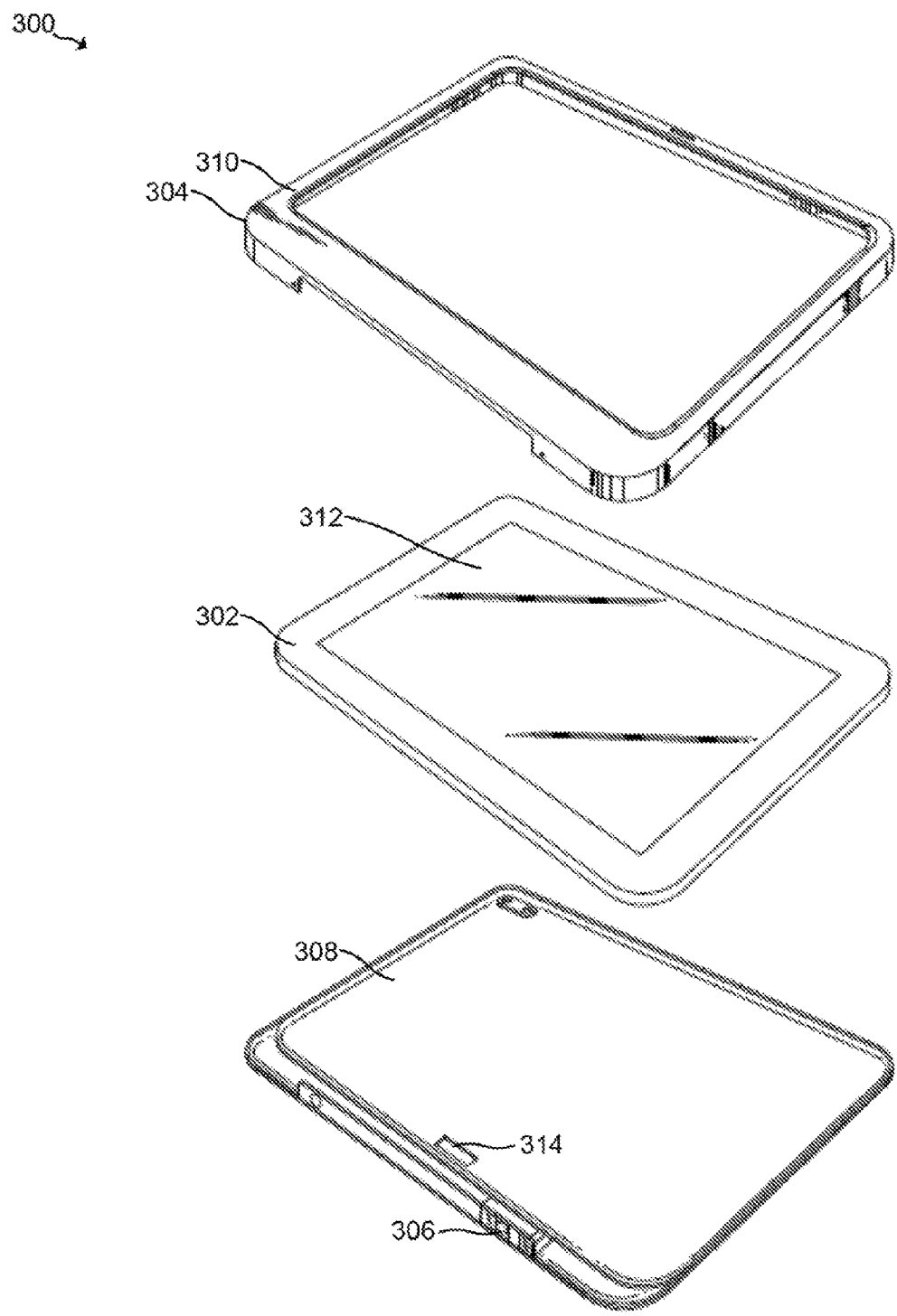
FIG. 3 is a schematic diagram of an example system including a computing device with a disassembled protective case having a barcode scanner.

FIG. 3 is a schematic diagram of an example system 300 including a computing device 302 with a disassembled protective case having a barcode scanner 306. The protective case of system 300 includes front housing portion 304 and back housing portion 308. Front housing portion 304 and back housing portion 308 may be removably coupled to form the assembled protective case with a cavity for computing device 302.

Front housing portion 304 may have a front plane 310 to allow screen 312 of computing device 302 to be exposed. Front housing portion 304 may expose screen 312 in any suitable manner (e.g., using a transparent material, a cut-out portion on front housing portion 304, etc.).

Back housing portion 308 may have a back plane to cover the back of computing device 302. When front housing portion 304 is coupled to back housing portion 308, a cavity to house computing device 302 and a scanning sidewall may be formed. The scanning sidewall may be perpendicular to and between front plane 304 and the back plane. The scanning sidewall may be a long sidewall that may protect the long edge of computing device 302 and may use barcode scanner 306 to scan a barcode. Barcode scanner 306 may be any suitable type of barcode scanner capable of scanning a barcode.

Computing device 302 may be communicatively coupled to the protective case via connector 314. Connector 314 may be any suitable connector that may transfer information between computing device 302 and the protective case (e.g., a pin connector). For example, when barcode scanner 306 scans a barcode, the barcode information may be sent from barcode scanner 306 to computing device 302 via connector 314.

Figure 4:
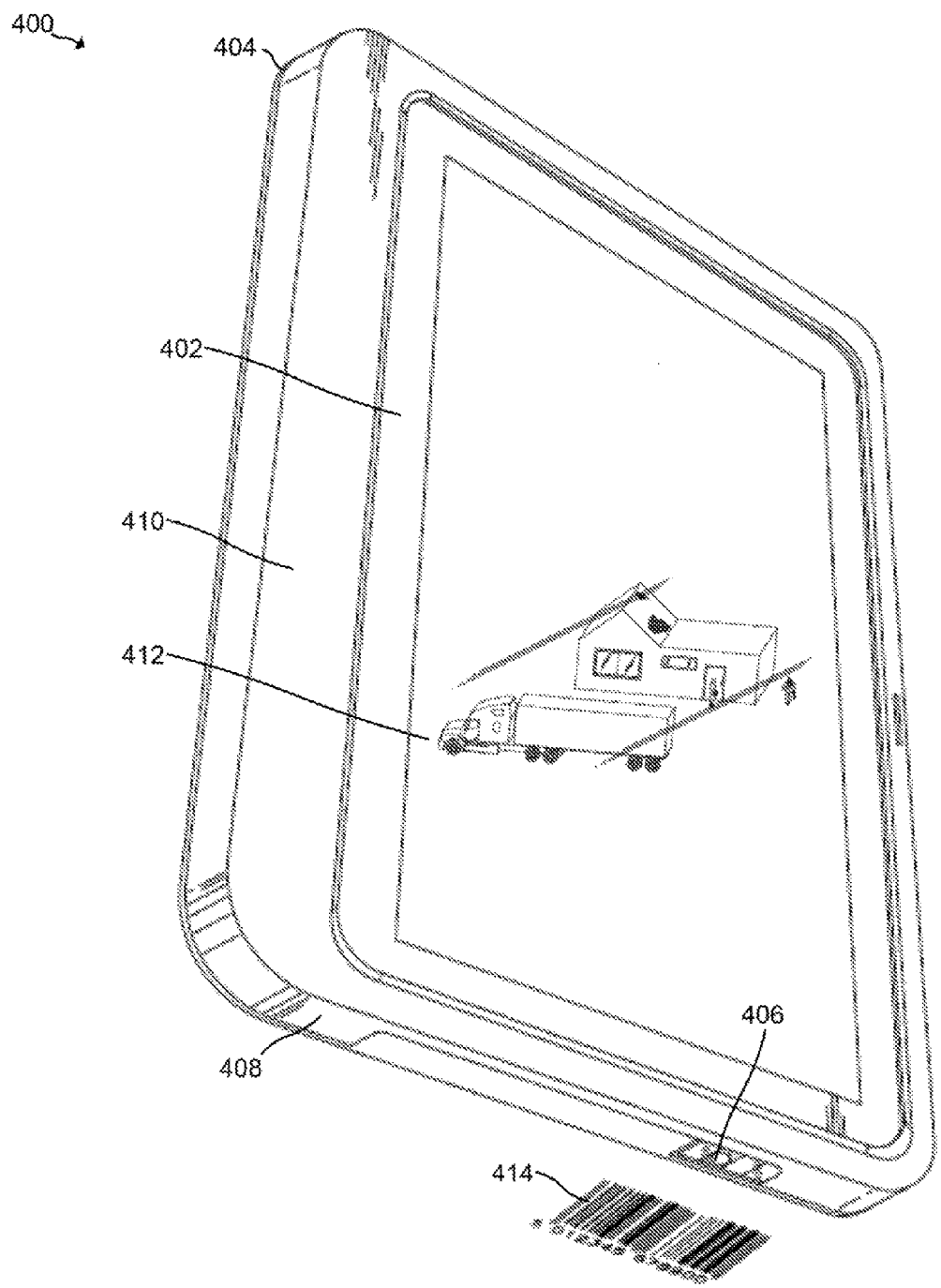
FIG. 4 is a schematic diagram of an example system with a computing device in a protective case with a barcode scanner located along a short sidewall of the protective case.

FIG. 4 is a schematic diagram of an example system 400 with a computing device 402 in a protective case 404 with a barcode scanner 406 located along a short sidewall 408 of the protective case 404. In the example of FIG. 4, computing device 402 is a tablet computer having screen 412 to display content.

Protective case 404 may include a display portion 410 that may cover the front of computing device 402 and may expose screen 412. Display portion 410 may expose screen 412 in any suitable manner (e.g., using a transparent material, a cut-out portion on front portion 410, etc.). Protective case 404 may also include a back portion to cover the back of computing device 402.

Protective case 404 may also include a short sidewall 408 that may be perpendicular to and between display portion 410 and the back portion. Short sidewall 408 may be a sidewall that protects the short edge of computing device 402. Short sidewall 408 may be a scanning sidewall that may scan barcodes (e.g., barcode 414) using barcode scanner 406, which may be any suitable type of barcode scanner. For example, a user may hold on to one or both of the long edges of computing device 402 in protective case 404 and may point barcode scanner 406 downward at barcode 414 to scan barcode 414. Computing device 402 may receive the barcode information from barcode scanner 406 via a connector on protective case 404 connecting computing device 402 to protective case 404.

The content displayed on screen 412 may be displayed such that the content is oriented based on the orientation of computing device 402 in protective case 404. For example, because barcode scanner 406 is pointed downward, the content on screen 412 is displayed based on computing device 402 in protective case 404 being oriented accordingly.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fail within the true spirit and scope of the present disclosure.

What is claimed is:

1. A protective case, comprising: a housing with a cavity to house a computing device, the housing comprising: a display portion to allow a screen of the computing device to be exposed, a back portion opposite the display portion and having a back plane to cover the back of the computing device: and a scanning sidewall perpendicular to and between the display portion and the back plane of the back portion; a short sidewall perpendicular to and between the display portion and the back portion; and a long sidewall perpendicular to and between the display portion and the back portion, the long sidewall being longer in length than the short sidewall; and a barcode scanner to scan a barcode from the scanning sidewall.

2. The protective case of claim 1, wherein content displayed on the screen is rotatable based on an orientation of the computing device housed in the housing.

3. The protective case of claim 1, wherein the scanning sidewall is the long sidewall.

4. The protective case of claim 1, wherein the scanning sidewall is the short sidewall.

5. An apparatus comprising: a front housing portion having a front plane to allow a screen of a computing device to be exposed; a back housing portion removably coupled to the front housing portion and having a back plane to cover the back of the computing device' wherein coupling the front housing portion and the back housing portion creates a cavity to house the computing device and creates a scanning sidewall perpendicular to and between the front plane and the back plane, and wherein coupling the front housing and the back housing portion further creates a short sidewall perpendicular to and between the display portion and the back portion; and a long sidewall perpendicular to and between the display portion and the back portion, the long sidewall being longer in length than the short sidewall; and a barcode scanner to scan a barcode from the scanning sidewall.

6. The apparatus of claim 5, wherein content displayed on the screen is rotatable based on an orientation of the computing device housed between the front housing portion and the back housing portion.

7. The apparatus of claim 5, wherein the scanning sidewall is the long sidewall.

8. The protective case of claim 5, wherein the scanning sidewall is the short sidewall.

9. A system comprising: a computing device; and a protective case coupled to and in communication with the computing device, the protective case comprising: a housing having a cavity to house the computing device, the housing comprising: a display portion to expose a screen of the computing device; a back portion opposite the display portion; and a scanning sidewall perpendicular to and between the display portion and the back portion; a short sidewall perpendicular to and between the display portion and the back portion; and a long sidewall perpendicular to and between the display portion and the back portion, the long sidewall being longer in length than the short sidewall; and a barcode scanner disposed adjacent to the computing device and in between the computing device and the scanning sidewalk the barcode scanner to scan a barcode from the scanning sidewall.

10. The system of claim 9, wherein content displayed on the screen is rotatable based on an orientation of the system.

11. The system of claim 9, wherein the scanning sidewall is the long sidewall.

12. The protective case of claim 9, wherein the scanning sidewall is the short sidewall.

\* \* \* \* \*

UNITED STATES PATENT AND TRADEMARK OFFICE
CERTIFICATE OF CORRECTION

| | |
|---|---|
| PATENT NO. | : 9,928,394 B2 |
| APPLICATION NO. | : 15/329869 |
| DATED | : March 27, 2018 |
| INVENTOR(S) | : Rudy Widiaman et al. |

It is certified that error appears in the above-identified patent and that said Letters Patent is hereby corrected as shown below:

On the Title Page

In item (56), under foreign patent documents, in Column 2, Line 2, delete "5/2000" and insert -- 05/2009 --, therefor.

Signed and Sealed this
Thirty-first Day of July, 2018

Andrei Iancu
*Director of the United States Patent and Trademark Office*